June 11, 1957 C. H. WHITE 2,795,157
TIRE CHAIN APPLYING TOOL
Filed March 6, 1956
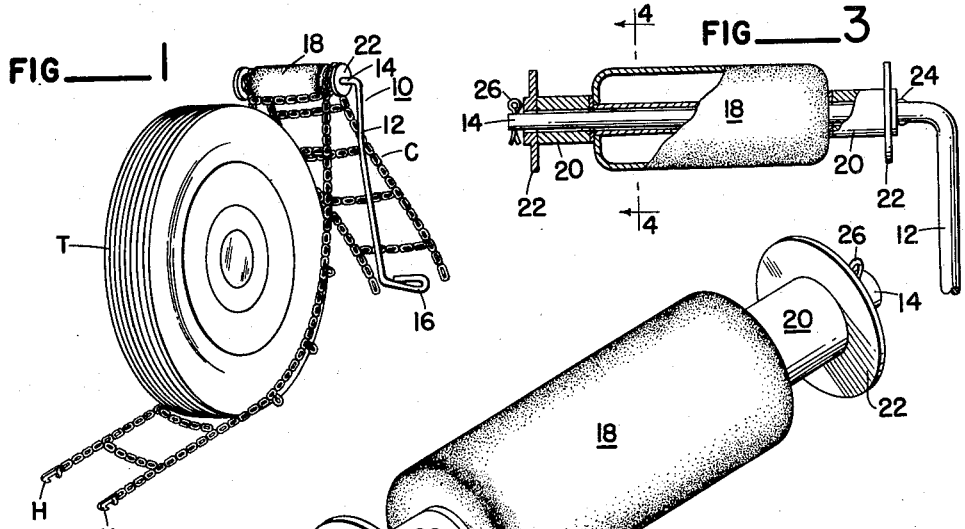
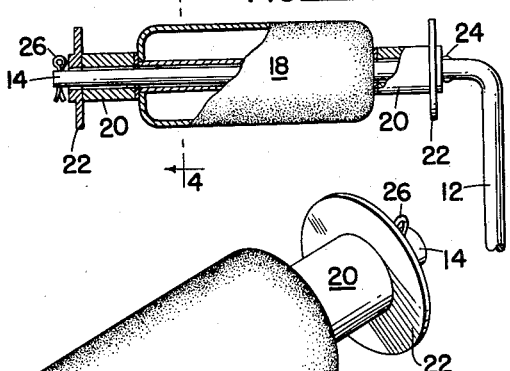
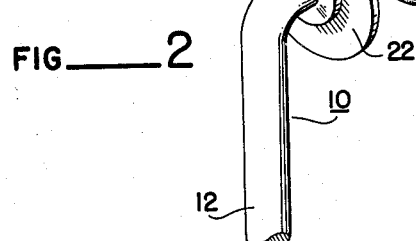
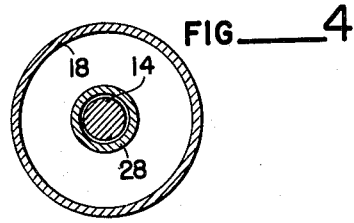
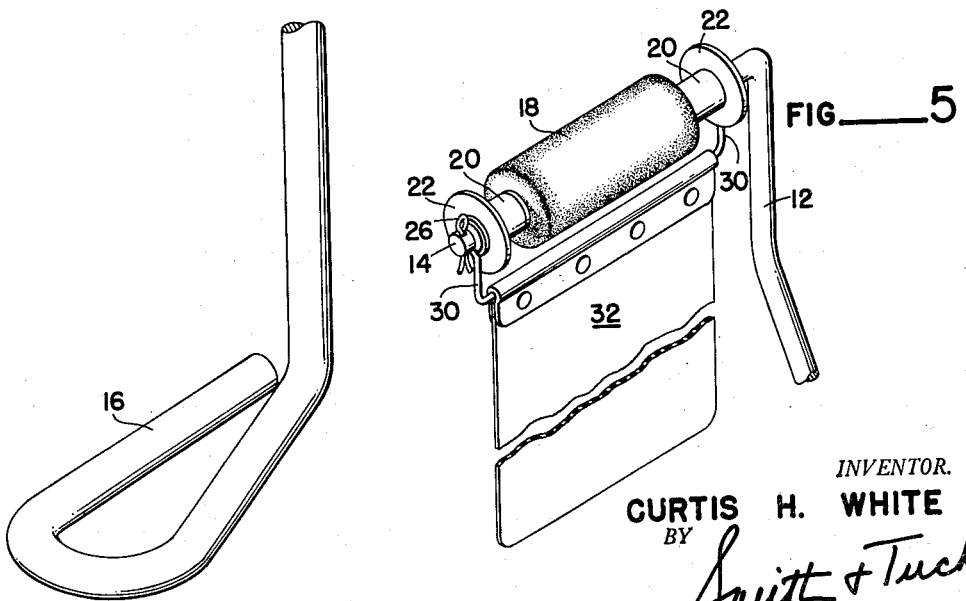
INVENTOR.
CURTIS H. WHITE
BY

United States Patent Office 2,795,157
Patented June 11, 1957

2,795,157
TIRE CHAIN APPLYING TOOL

Curtis H. White, Wenatchee, Wash.

Application March 6, 1956, Serial No. 569,820

3 Claims. (Cl. 81—15.8)

This invention relates to a tire chain applying tool and is, more particularly, a tool for applying and draping tire chains on motor vehicle wheels while the same are in place on the vehicle.

A principal object of this invention is the provision of a tire chain draping tool which is so constructed and arranged that the application of tire chains to automobile tires on modern passenger cars having fenders with low hanging apron is considerably facilitated and the necessity of jacking the vehicle body and its fenders is obviated.

Another object of the invention is to provide a tire draping tool over which an intermediate portion of a tire chain may be hung to raise and wrap an end of the chain around the tire while at the same time disposing the hung over portion at or near the upper part of the tire whereupon the overlapping chain part may likewise be readily wrapped and draped around the tire through a rolling motion all by persons of relatively slight skill and without requiring excessive strength on the part of the operator.

Still another object of this invention is to provide a tool of the character described which is simple in construction, rugged and durable in use, efficient in operation and capable of economical manufacture.

These and other objects of this invention will be more apparent during the course of the following specification.

In the accompanying drawings, in which is shown a preferred form of my invention and a modification thereof:

Figure 1 is a perspective view showing the chain draping operation relative a tire;

Figure 2 is an enlarged view in perspective with portions broken away of my tire chain tool;

Figure 3 is a view in elevation of the roller end of my tire tool with portions broken away and omitted to disclose internal construction;

Figure 4 is a cross sectional view taken on line 4—4 of Figure 3; and

Figure 5 is a fragmentary perspective view of a modified form of my tire draping tool.

While I show in the drawings and describe throughout specific construction and arrangement of parts in my tool it will of course be apparent to those skilled in the art that changes and modifications may be made, those changes and modifications which come fairly within the spirit and scope of the subjoined claims constitute a part of this invention.

Referring to Figure 1 where I have shown the tool 10 designated as a whole as it appears when being employed in draping a tire chain C around the tire T as it rests on a free end of the chain.

The tool comprises an L-shaped member formed of two arms 12 and 14 disposed at right angles to each other. Arm 12 has an end turned back upon itself to form the handle 16.

Arm 14 supports for a rolling motion the roller 18 which I prefer to designate as the tread-roller, while arm 14 is of a length to span or extend across the tread of a tire as well as its broader dimensions produced by the swelling sidewalls roller 18 is in length approximately the same as the tread of the tire T. Roller 18 is permitted to freely rotate on the arm 14 at each end of roller 18 is an independently rotatable chain roller 20, also mounted on arm 14. At the outer end of each of the independent chain rollers is a freely rotatable flange or washer 22, secured against movement out of position by means of raised boss or the like 24 in the case of the flange nearest the junction of arms 12 and 14 or of the cotter pin 26 at the other end of arm 14.

For convenience of construction roller 18 is shown as being formed from a tube having its ends belled or cut inward and mounted on a bearing tube 28 of a diameter suitable to permit free rotation on the arm 14; this construction is shown in Figures 3 and 4.

Anyone who has had experience in the application of a tire chain to an automobile tire on vehicles in which the wheels are substantially enclosed within the body or fenders knows that it is a difficult problem because space is limited, the chains are heavy and difficult to manipulate and the operation must be carried on normally under adverse conditions. Much if not all of these difficulties is easily accommodated by the use of my tool. The operator first lays the tire chain on the ground so that the vehicle wheel may be rolled on to an end of the tire chain to the second or third cross link substantially as shown in Figure 1 this leaves free a short portion of the tire chain which may include the hooks H, H by which the ends of the chain are locked together my tool 10 is next disposed against the outside of the tire chain about 3, 4 or 5 cross links from the other free end of the chain C also as shown in Figure 1 in this instance the side strands of the chain overlie and freely move with the chain rollers 20, 20 and the side chains are kept apart by the roller 18. By manually manipulating the arm 12 and handle 16 of the tool the chain may be lifted up and around and across the top of the tire so that the roller 18 comes in contact with the same approximately at the crest of the tread in this way the cross links between the point where the chain is anchored to the ground by the weight of the wheel and the point where the chain is brought to the tire at its upper part may be smoothly and quite tightly spread across the tire tread thereafter the operator merely causes the roller 18 to roll, in the case shown in Figure 1, toward the viewer and downward to approximately the nine or ten o'clock position. During this movement of roller 18 the side strands of the tire chain are paid out or rolled over rollers 20, 20 and as each succeeding cross chain approaches the roller it easily moves up and over the top of roller 18 to come into position on the tire tread, this movement of roller 18 will complete the draping of the chain and the tool may thereupon be laid aside while the hooks H are engaged in the ends of the side strands of the chain.

The flanges 22 may or may not be a part of rollers 20, I have found it most practical to produce these flanges by applying large sized washers of a diameter substantially that of roller 18. These flanges insure that the side strands of the chain do not slide or drop off of the rollers 20, 20 in the case of the tires having extremely broad treads the flanges 22 will roll on the tire tread and facilitate movement of the tool during the draping operation.

In the modified form of the invention shown in Figure 5 the tool in all respects is as previously described except that a U-shaped yoke comprising arms 30, 30 is hung from the arm 14 of the tool 10 arms 30 have eyes at their free end which wrap around the arm 14 hanging from arms 30, 30 and spanning the roller 18 is an apron 32 which may be formed of metal or flexible belt material and which during the draping operation trails behind the tread-roller, such apron insures during the draping of the chain that the cross links which are being payed out do not get entangled with and hang up on cross links which already have been brought into position on the tire tread.

Having thus described my invention, I claim:

1. A tire chain draping tool, comprising: an L-shaped member providing arm means adapted to be manually manipulated in applying and draping chains around an automobile tire, said L-shaped member having an arm to span the tire tread, a tread-roller rotatable on said arm, and a chain-roller independently rotatable at each end of said tread-roller, said chain rollers being of reduced size relative said tread-roller.

2. A tire chain draping tool, comprising: an L-shaped member providing arm means adapted to be manually manipulated in applying and draping chains around an automobile tire, said L-shaped member having an arm to span the tire tread, a tread-roller rotatable on said arm, a chain-roller independently rotatable at each end of said tread-roller to receive the side strands of a tire chain, said chain-rollers being of reduced size relative said tread-roller, and a rotatable flange at the outer end of each independent chain-roller said flanges being substantially the same diameter as said tread-roller.

3. A tire chain draping tool, comprising: an L-shaped member providing arm means adapted to be manually manipulated in applying and draping chains over an automobile tire, said L-shaped member having an arm to span the tire tread, a tread-roller rotatable on said arm, a chain-roller independently rotatable at each end of said tread-roller to receive the side strands of a tire chain, said chain-rollers being of reduced size relative said tread-roller, and an apron depending from said tire tread spanning arm in trailing relation behind said tread-roller.

References Cited in the file of this patent

UNITED STATES PATENTS

| | | |
|---|---|---|
| 1,517,495 | Craddock | Dec. 2, 1924 |
| 2,280,316 | Spock | Apr. 21, 1942 |